United States Patent [19]

Meins et al.

[11] Patent Number: 4,866,380

[45] Date of Patent: Sep. 12, 1989

[54] METHOD AND APPARATUS FOR DETERMINING THE DISTANCE BETWEEN AN ELECTROMAGNETIC SENSOR AND A CONDUCTIVE RAIL

[75] Inventors: Juergen Meins, Baldham; Helmut Grosser, Maisach; Gerhard Holzinger, Munich, all of Fed. Rep. of Germany

[73] Assignee: Thyssen Industrie AG, Fed. Rep. of Germany

[21] Appl. No.: 237,700

[22] Filed: Aug. 26, 1988

Related U.S. Application Data

[63] Continuation of Ser. No. 63,692, Jun. 15, 1987, abandoned, which is a continuation of Ser. No. 589,760, Mar. 15, 1984, abandoned.

[30] Foreign Application Priority Data

Mar. 16, 1983 [DE] Fed. Rep. of Germany ....... 3309337

[51] Int. Cl.⁴ .......................... G01B 7/14; B60L 13/06
[52] U.S. Cl. ...................................... 324/207; 104/284
[58] Field of Search ................ 324/207, 208, 225–243, 324/224; 104/284

[56] References Cited

U.S. PATENT DOCUMENTS

| | | | |
|---|---|---|---|
| 2,807,720 | 9/1957 | Charles | 324/225 X |
| 3,271,664 | 9/1966 | Mounte et al. | 324/232 X |
| 3,721,821 | 3/1973 | Blanyer | 324/207 X |
| 3,849,724 | 11/1974 | Ghibu et al. | 104/284 X |
| 3,865,043 | 2/1975 | Schwärzler | 104/284 |
| 3,949,293 | 4/1976 | Enabnit | 324/207 |
| 4,001,718 | 1/1977 | Wilson et al. | 324/207 X |
| 4,095,179 | 6/1978 | Bremer et al. | 324/207 |
| 4,355,281 | 10/1982 | Toth et al. | 324/232 |

FOREIGN PATENT DOCUMENTS

| | | |
|---|---|---|
| 0001505 | 4/1979 | European Pat. Off. . |
| 2151608 | 4/1973 | Fed. Rep. of Germany ...... 104/284 |
| 2163832 | 7/1973 | Fed. Rep. of Germany . |
| 2317643 | 10/1974 | Fed. Rep. of Germany ...... 104/284 |
| 2803887 | 8/1978 | Fed. Rep. of Germany . |
| 2916289 | 5/1980 | Fed. Rep. of Germany . |
| 3237843 | 4/1983 | Fed. Rep. of Germany . |
| 980467 | 1/1965 | United Kingdom . |
| 1304252 | 1/1973 | United Kingdom . |
| 1346388 | 2/1974 | United Kingdom . |
| 1457262 | 12/1976 | United Kingdom . |
| 1528487 | 10/1978 | United Kingdom . |
| 2054867A | 2/1981 | United Kingdom . |

OTHER PUBLICATIONS

"Regelung eines elektromagnetischen Schwebefahrzeugs mit integriertem Antriebs-, Trag-, und Fuhrungssystem", Regelungstechnik, vol. 26, No. 9, Aug. 1978 pp. 258–265.

"Electromagnetic suspension and levitation", I.E.E. Proceedings Section A a I, vol. 129, Nov. 1982, No. 8, Part A, Old Woking, Surrey, Great Britain, pp. 549–581.

*Primary Examiner*—Reinhard J. Eisenzopf
*Assistant Examiner*—Warren S. Edmonds
*Attorney, Agent, or Firm*—Hill, Van Santen, Steadman & Simpson

[57] ABSTRACT

A method and an apparatus are provided for determining the distance of a probe, particularly a magnetic bearing or a magnetic levitation device, from a conductive reaction rail. The probe comprises at least one sensor having at least two magnetically-coupled coils disposed opposite the reaction rail. The coils generate an alternating magnetic field whose influences (eddy currents) are detected by the sensor and employed for identification of the distance. In order to achieve a high, useful voltage level, insensitivity to external electrical fields and potential fluctuations, as well as a small influence of system-conditioned magnetic fields, the influences of eddy currents induced in the reaction rail by the alternating magnetic field are acquired and utilized for the identification of the distance.

14 Claims, 2 Drawing Sheets

METHOD AND APPARATUS FOR DETERMINING THE DISTANCE BETWEEN AN ELECTROMAGNETIC SENSOR AND A CONDUCTIVE RAIL

This is a continuation of application Ser. No. 063,692, abandoned, filed Jun. 15, 1987, which is a continuation of Ser No. 589,760, filed 3-15-84, abandoned.

BACKGROUND OF THE INVENTION

1. Field of the Invention

The present invention relates to a method for determining the distance of a sensor with respect to a conductive reaction rail, particularly for application with magnetic bearings or magnetic levitation devices such as are employed in magnetic transportation engineering for the positional control of support and guide magnets using a coil system at the sensor side. The coil system generates a chronologically-changing magnetic field, whereby the reactions of eddy currents induced in the reaction rail are consulted for the identification of the distance from the rail. The invention also relates to an apparatus for implementing the method.

2. Description of the Prior Art

Contact-free measurement of a distance has already been thoroughly investigated. Given such a known method, for example as set forth in the German published application 28 03 887, the distance-dependent magnetic coupling of two coils is exploited. The great sensitivity to the frequency exciting the coils, as well as to external magnetic fields, is thereby disadvantageous. In influencing of the ferro-magnetic material used to construct the sensor, due to external magnetic fields, is also thereby unfavorable because the measuring field is also influenced, as set forth in the German published application 32 37 843. As a rule, the sensors also extend over a plurality of fields of a grooved reaction rail, as disclosed in the German published application 29 16 289.

SUMMARY OF THE INVENTION

The object of the present invention is to provide an improved method and apparatus of the type initially set forth such that a high useful voltage level that is insensitive to external electrical fields and potential fluctuations occurs, such that the influence of system-conditioned magnetic fields is low, and such that imaging of the grooved reaction rail are largely reduced in the measured signal.

Beginning with the method of the type initially set forth, the above object is achieved, according to the present invention, in the changes in the inductance of the overall coil system do not exert an influence on the distance-dependent signal due to the fact that the inductive reactance of the coil system utilized for generating the magnetic alternating field is compensated.

Given the method of the invention, the magnetic gap-dependent damping of the magnetic alternating field due to eddy current factors of the reaction rail is exploited. The coil system utilized for generating the magnetic alternating field can be designed such that neutrality prevails with respect to electrical fields. Given a corresponding design of the coils employed for the construction of the sensor, a distribution of the magnetic field components can be achieved wherein a high field component impinging the plane of the reaction rail in the normal direction can be employed for distance measurement. It has been shown that even partial damage to the grooves or, respectively, teeth of the reaction rail only has a slight influence on the measured signal.

An apparatus for the implementation of the method is characterized in that the coil of the sensor are coupled via a capacitor operated in parallel and series connection, whereby it is possible to compensate the inductive reactance of the coil system formed by the two coils.

Further fluctuations can be eliminated in that a regulating device for influencing the frequency of the alternating voltage feeding the coil system is provided. The regulating device can comprise a capacitor, whose input and output are applied to a multiplier, whereby the output of the multiplier charges a regulator which controls the frequency of an alternating voltage source to which the capacitor is connected. The frequency of the alternating voltage feeding the coil system is thereby influenced such that the inductive reactance of the coil system of the sensor is completely compensated at all operating points with the assistance of the capacitor operated in parallel or series connection.

It is advantageous for the construction of the coil system when respectively two coils of the sensor are wound in opposite senses, whereby the conductors of the coils should be essentially disposed next to one another and parallel to one another in a preferred execution. It is thereby achieved that the electrical fields generated by the coils compensate one another. External electrical fields cannot have any influence on the measured signal.

A plurality of coil systems comprising two coils, magnetically-coupled to one another, can be provided next to one another along the reaction rail in order to concentrate the magnetic flux to the reaction rail.

The distribution of the magnetic flux at right angles relative to the reaction rail can be influenced in that each coil system consists of a plurality of individual coils disposed at right angles relative to the reaction rail.

In order to reduce effects of a temperature-dependent change of the coil resistance of the measured signal, or in order to avoid the same, a temperature-compensating coil, disposed orthogonally to the coil system, can be assigned to each coil system.

Another possibility provides for the parallel or series connection of a temperature-dependent resistor to the coil system in order to keep the quality of the coil system generating the measured field independent of temperature.

The coil systems can respectively be disposed between two magnetic poles of the probe so that the respective measurement only extends over a range of one groove division of the reaction rail. An enlargement of the magnetic gap is thereby avoided.

The coil system, or the coil systems, and temperature-compensating coils assigned thereto under given conditions, can be accommodated in a housing of conductive material that is opened towards the reaction rail. This housing, which can consist of metal, particularly aluminum, has a shielding effect such that the distribution and change of the magnetic field employed for measuring purposes depends only on the influence of the eddy currents generated in the reaction rail by the magnetic field and not on the influence of eddy currents generated by external fields.

BRIEF DESCRIPTION OF THE DRAWINGS

Other objects, features and advantages of the invention, its organization, construction and operation will be best understood from the following detailed description, taken in conjunction with the accompanying drawings, on which.

DESCRIPTION OF THE PREFERRED EMBODIMENTS

Figure 1:
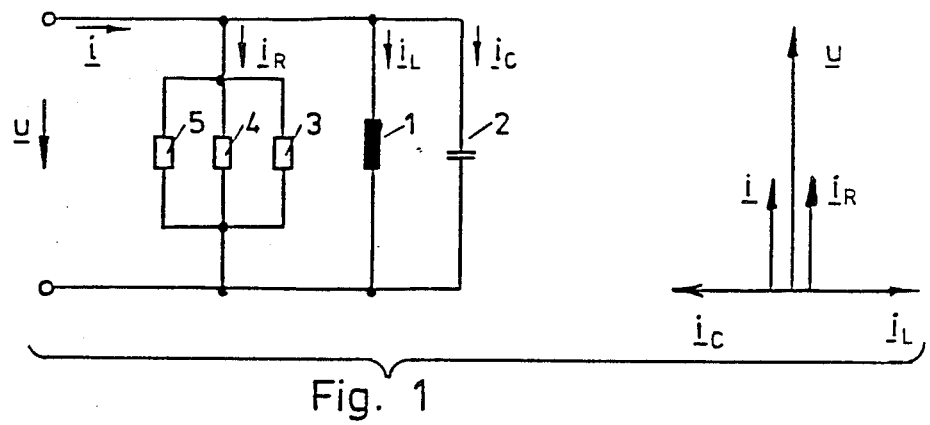
FIG. 1 is a schematic illustration of an equivalent circuit diagram of a sensor for determining the distance of a magnetic probe from a conductive reaction rail, according to the present invention.

The sensor illustrated on the drawing can be realized, for example, for measuring the distance of a magnetic pole shoe of a magnetic levitation train from the upper side of the assigned reaction rail. Assigned to the sensor are two magnetically-coupled coils 10, 11 (FIG. 3) having assigned capacitors 12, 13 respectively connected in parallel therewith. The coils 10, 11 are fed from an alternating voltage source 15 via a capacitor 14. The voltages applied to the capacitor 14 by the source 15 are supplied to a multiplier 16 whose output signal contains a d.c. component whose amplitude and operational sign (direction) are dependent on the size of the inductive or, respectively, capacitive reactance component of the arrangement. The d.c. component of the multiplier 16 is supplied to a regulator 17 for processing of this signal, the processed signal then supplied to the alternating voltage source 15 in order to effect a frequency change in the voltage feeding the coil system 10, 11 such that the reactive component of the impedance of the arrangement comprising the elements 10, 11 in parallel with the elements 12 and 13 is compensated to zero.

Figure 3:
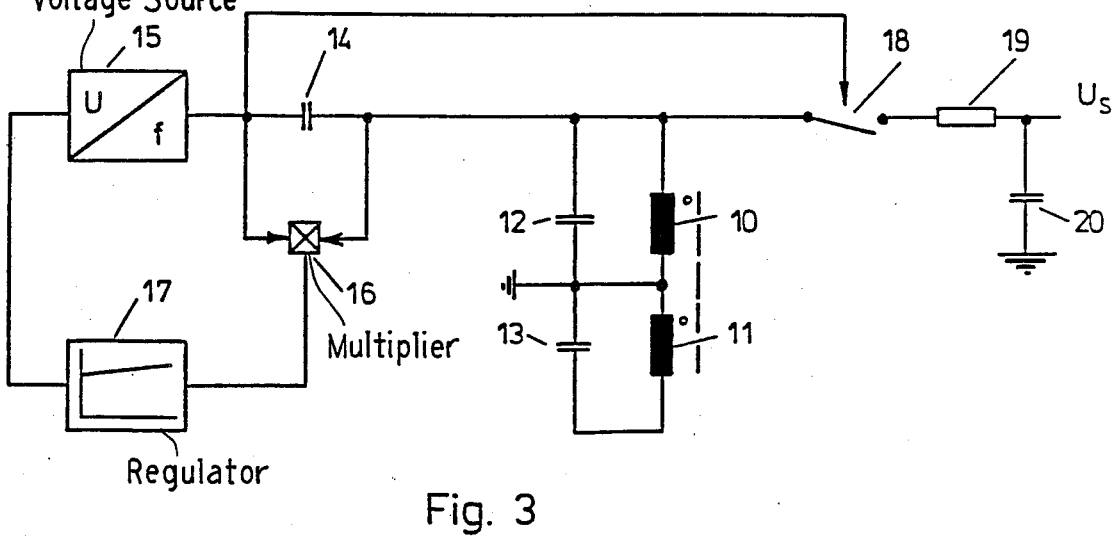
FIG. 3 is a schematic representation of the sensor of FIG. 1 having an assigned automatic control system.

The magnitude of the voltage existing at the coil 10 is employed as a measure for the distance information sought. This voltage varies under the influence of the eddy current fields generated in the reaction rail, which lies opposite the coils 10, 11, by the magnetic alternating field generated by the coils 10, 11. In FIG. 3, the reaction rail is indicated by a broken line. The voltage of the coil 10 forms the sought measured signal as a d.c. voltage applied to a capacitor 20 after rectification by a synchronizing switch 18 operated at the frequency of the source 15, as schematically illustrated, and having a following filter 19, 20.

Figure 2:
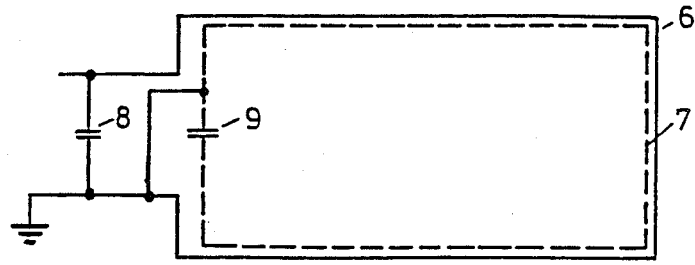
FIG. 2 is a schematic illustration of the structure of a coil system comprising two coils that are magnetically coupled to one another.

The geometrical structure of a coil system comprising a pair of coils 6, 7 is schematically illustrated in FIG. 2. The coils 6, 7 are wound in opposite senses, whereby the conductors of the coils are essentially disposed adjacent one another. As a result thereof, the coil system comprising the two coils 6, 7 becomes insensitive to external electrical fields. A capacitor 8 is connected in parallel to the coil 6 and a capacitor 9 is connected in parallel to the coil 7 in the manner illustrated. When this arrangement is fed with an electrical alternating field, a voltage is induced therein, whereby the electrical potentials of both coils 6, 7 exhibit different operational signs. The distributions of the electrical field produced by each coil 6 and 7, respectively, mutually compensate one another such that the influence of voltages capacitively coupled in, such voltages being produced by an external electrical field, exhibit no influence on the electrical values of the coil system comprising the two coils 6, 7.

Figure 4:
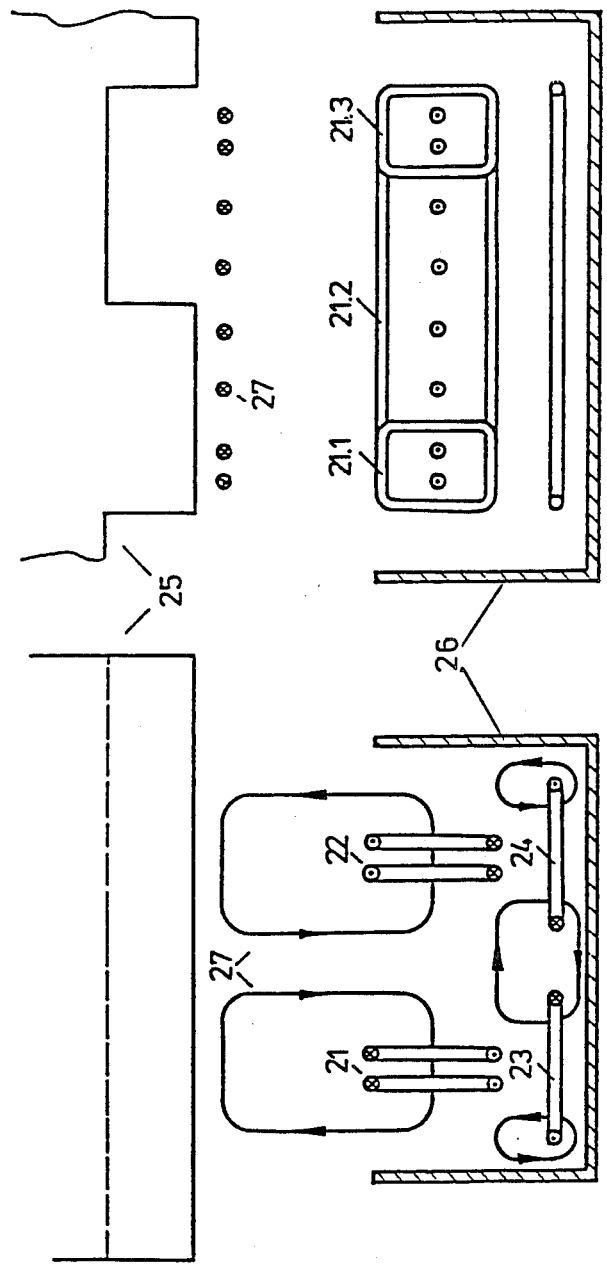
FIG. 4 is a schematic illustration of a cross-sectional and longitudinal section through a sensor disposed below a reaction rail.

The practical embodiment of the invention illustrated in FIG. 4 comprises two coil systems 21, 22 which respectively comprise an arrangement in accordance with FIG. 2. When the two coil systems 21, 22 are fed in accordance with the indicated directions of current, then the magnetic field existing between the two coil systems is intensified as a result thereof. The three-dimensional expanse of the magnetic field is enlarged to such an extent that the reaction rail 25 is detected by the magnetic field, even given greater distances from the reaction rail 25 which is shown as being grooved. Eddy currents are then generated in the stator packet of the reaction rail 25, these in turn influencing the magnetic field as a function of the respective distance.

In order to reduce or compensate the influence if a temperature-dependent change of the coil resistance on the measured signal, temperature-compensating coils 23 or, respectively, 24 are assigned to that side of the coil systems 21, 22 facing away from the reaction rail 25, and are disposed in orthogonal disposition relative to the assigned coil sytems 21, 22. The temperature-compensating coils are thereby not exposed to the magnetic influence of the reaction rail.

The coil systems 21, 22 and their assigned temperature-compensating coils 23, 24 are accommodated in a housing 26 that is opened towards the reaction rail 25. The housing 26 comprises aluminum and, due to its shielding effect, guarantees that the distribution of the magnetic field generated by the coil systems 21, 22 is only influenced by the reaction rail 25 and is therefore independent of other influences.

As shown in the right-hand part of FIG. 4, the coil systems 21, 22 can comprise a plurality of individual coils 21.1, 21.2, 21.3 disposed behind one another at right angles relative to the reaction rail 25. As a result thereof, the distribution of the magnetic field 27 can be influenced such that the influence of the grooving on the measured signal is minimized given measurement of the distance to the groove reaction rail 25. In this context, the coil systems 21, 22 with their assigned temperature-compensating coils 23, 24 and the housing 26 are preferably respectively disposed between two magnetic poles of the probe, which is not illustrated in detail.

The equivalent circuit diagram in FIG. 1 shows a coil system 1 whose inductive reactance component is compensated by a parallel-connected capacitor 2. Further, a temperature-dependent resistor 3, corresponding to the coil losses, a distance-dependent resistor 4 corresponding to the eddy current losses induced in the reaction rail, and a further resistor 5 are connected in parallel to the coil system 1, the further resistor 5 being responsible for the temperature independence of the arrangement given an opposite temperature coefficient matched to the resistor 3.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. In a method for determining the distance between an electromagnetic sensor mounted on a levitation vehicle and a conductive rail for levitating the vehicle, comprising the steps of:
   (a) applying an alternating voltage to a coil system of the sensor to generate a chronologically changing magnetic field;
   (b) producing eddy currents in the conductive reaction rail by applying the field to the rail;
   (c) compensating any changes in reactance in the coil system by changing the frequency of the alternating voltage so that said reactance is compensated to a value of zero;
   (d) sensing with the coil system the reactions of the eddy currents induced therein; and
   (e) producing a voltage signal within said coil system that is influenced by said sensed eddy currents which is a measure of the distance between the coil system and the conductive reaction rail.

2. The method of claim 1, wherein the coil system has at least one coil and comprising the further step of:
   capacitively coupling each coil with respect to a source of the alternating voltage.

3. An apparatus for determining the distance between an electromagnetic sensor and a conductive reaction rail, comprising:
   (a) a magnetic levitation vehicle;
   (b) a conductive reaction rail;
   (c) a source of alternating voltage carried by said vehicle, said source being controllable in frequency;
   (d) an electromagnetic sensor carried by said vehicle, said sensor being spaced from said conductive reaction rail, said sensor comprising first and second coils and first and second capacitors, said first coil and said first capacitor being connected in parallel and being connected on one end to each other and on another end to ground; said second coil and said second capacitor being connected in parallel and on one end being connected to ground and on another end to said source, said coils being driven by said source to cause eddy currents to said conductive reaction rail, said coils further sensing the reactions of said eddy currents to said sensor to produce an output signal representing the distance between the sensor and the conductive reaction rail;
   (e) a third capacitor coupling said source to said coils; and
   (f) regulation means operatively connected in parallel across said third capacitor and to said source for controlling the frequency of the alternating voltage in response to the voltage across said third capacitor.

4. The apparatus of claim 3, wherein said regulating means comprises:
   said third capacitor, including an input terminal and an output terminal;
   a multiplier including a pair of input terminals respectively connected to said input and output terminals of said third capacitor and operable to provide an output signal having a d.c. component whose amplitude and polarity represent the reactance of said sensor; and a regulator circuit connected between said output of said multiplier and said source for controlling the frequency of the alternating voltage in accordance with said d.c. component.

5. The apparatus of claim 4, wherein:
   said first and second coils are wound in opposite sense and connected such that the fields generated thereby compensate one another to zero.

6. The apparatus of claim 5, wherein: said first and second coils comprise conductors which are essentially adjacent and parallel to one another.

7. The apparatus of claim 6, wherein:
   a plurality of said coil systems each comprising first and second magnetically coupled coils, said coil systems disposed next to one another along said conductive reaction rail.

8. The apparatus of claim 7, wherein:
   each of said coil systems comprises a plurality of coils disposed at right angles with respect to said conductive reaction rail.

9. The apparatus of claim 8, wherein:
   each of said coil systems further comprises a temperature-compensating coil driven in the same manner by said source, disposed orthogonally with respect to said first and second coils and producing a temperature-compensating output signal.

10. The apparatus of claim 8, and further comprising:
    a temperature-compensating resistance connected to a respective coil system and having a temperature coefficient opposite to that of said coil system.

11. The apparatus of claim 10, and further comprising:
    a magnet to be position stabilized for each coil system, said magnet comprising two poles and the respective coil system disposed between said two poles.

12. The apparatus of claim 11, and further comprising:
    a housing containing a coil system, said housing including means defining an open side facing said conductive reaction rail.

13. The apparatus of claim 12, wherein: said housing comprises metal.

14. The apparatus of claim 12, wherein:
    siad housing comprises aluminum.

* * * * *